Nov. 24, 1964     A. E. RESNIK     3,158,859
DOPPLER RADAR SYSTEM

Filed Oct. 5, 1955     2 Sheets-Sheet 1

INVENTOR.
ARNOLD E. RESNIK
BY
ATTORNEYS

Nov. 24, 1964     A. E. RESNIK     3,158,859
DOPPLER RADAR SYSTEM
Filed Oct. 5, 1955     2 Sheets-Sheet 2

INVENTOR.
ARNOLD E. RESNIK
ATTORNEYS

United States Patent Office 3,158,859
Patented Nov. 24, 1964

3,158,859
DOPPLER RADAR SYSTEM
Arnold E. Resnik, Ontario, Calif., assignor to the United States of America as represented by the Secretary of the Navy
Filed Oct. 5, 1955, Ser. No. 538,814
12 Claims. (Cl. 343—7)
(Granted under Title 35, U.S. Code (1952), sec. 266)

The invention described herein may be manufactured and used by or for the Government of the United States of America for governmental purposes without the payment of any royalties thereon or therefor.

This invention relates to a radar system and more particularly to a doppler radar system which provides an indication by reflected energy to a transmitting and receiving station of the position of a moving object such as an aircraft or a beam riding missile relative to another reference point such as a ground or airborne target.

One previous method of determining such distances is the use of triangulation by Shoran or optical surveying apparatus, however, Shoran requires a number of stations at different locations as does the optical system and also requires more expensive equipment. The optical system is relatively slow and cumbersome to operate.

In guided missiles the distance from the missile to the aircraft or other targets is usually obtained by the circuits in the missile for guidance or fuze operation, however, these systems required additional equipment in the missile to determine the range from missile to target.

In one preferred embodiment of the present invention, a radar antenna directs a signal at an aircraft. The signal is reflected directly by the aircraft to the antenna at the transmitting and receiving station and is also reflected towards a secondary reflector which reflects the energy back to the aircraft and thence back to the transmitting and receiving station. The energy reflected from the aircraft in both instances is modified by the doppler effect and by combining and comparing the frequencies received along the different paths an indication of the aircrafts position may be obtained, since one of the difference frequencies will reach a minimum when the aircraft is directly over the secondary reflector.

In a second preferred embodiment of the present invention the radar antenna, which is illuminating a guided missile, also directs energy toward the target aircraft. The energy is reflected back from the target aircraft to the receiver of the transmitting station and also is reflected from the missile to the target aircraft and back to the receiver along a secondary path. Again these signals are modified by the doppler effect of the velocity of the target aircraft and the relative speed between the target and the missile. By beating these modified frequencies with the transmitted frequencies and passing the beat frequencies through a discriminator, a voltage output may be obtained which will reach a minimum at a minimum range and can be utilized for actuating the fuze in the missile.

One object of the present invention is to provide an accurate indication when an aircraft or other moving object is passing over or by a reference point which may be a fixed point on the ground or another moving object with this indication being observed at a point distant from the reference point.

Another object of the present invention is to provide a fuzing system whereby the closest approach of a beam riding missile to an airborne target is indicated in the missile guidance radar which will then transmit the firing signal to the missile.

Still another object of the present invention is to provide a method and apparatus for accurately indicating when a moving object has reached the point of closest approach to a reference point which requires less equipment than existing radar methods and is faster than the present optical methods.

A still further object of the present invention is to provide a means for actuating the fuzing system of a beam riding missile wherein no additional equipment is required in the guided missile to provide the fuze action.

A still further object of the present invention is to provide a fuzing system for guided missiles wherein the components required for proximity fuzing action are not expended with each missile, are not subjected to the vibration and shock of missile flight, and are not restricted by the space limitations of missile installations, since they may be incorporated in the missile guidance radar system at a ground or other control station.

Still another object of the present invention is to utilize the secondary doppler effects between a moving object and a secondary reflecting surface to detect the presence of the object and indicate its point of closest approach to a reference point such as a ground position or a missile.

Other objects and many of the attendant advantages of this invention will be readily appreciated as the same becomes better understood by reference to the following detailed description when considered in connection with the accompanying drawings wherein.

Figure 1:
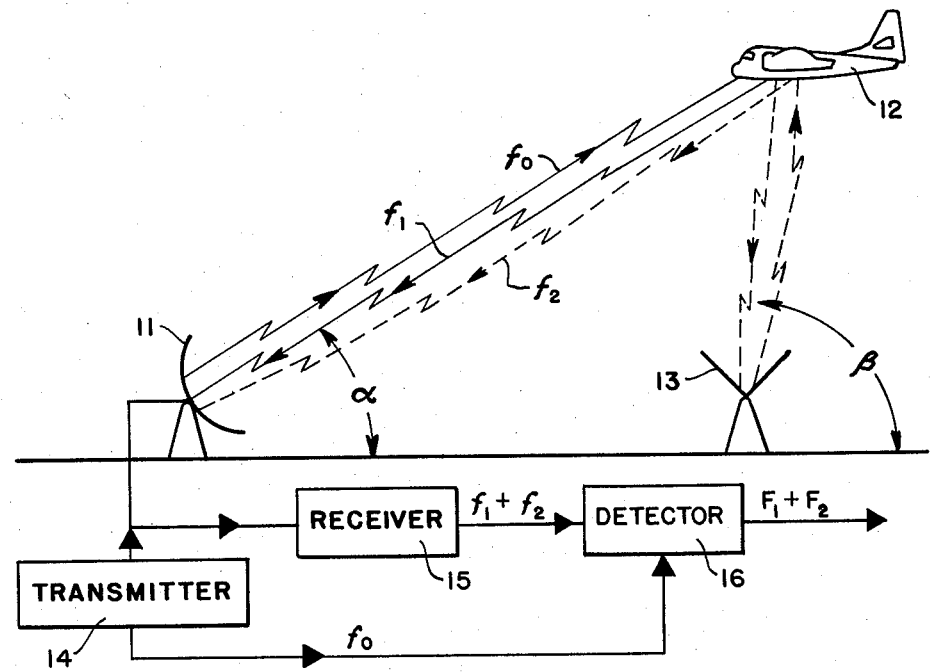
FIG. 1 is a schematic block diagram illustrating one preferred embodiment of the present invention.

Referring now to the drawings in detail, one preferred embodiment of the present invention is illustrated in FIG. 1 wherein the antenna 11 transmits a radio frequency signal, which may be a continuous wave, a pulse, or a frequency modulated signal, towards the aircraft 12. The reflected energy from the aircraft 12 will strike the corner reflector 13 and be reflected back towards the target aircraft 12 where it is reflected again back towards the antenna 11 at the ground station which is remote from the reference point at which the corner reflector 13 is located. It will be apparent that a large number of these corner reflectors at different positions may be utilized, if desired, to pick up approaching aircraft in different directions from the central control station at 11.

Assuming a continuous wave system, transmitter 14 sends out a continuous wave of radio frequency energy at a frequency $f_0$ which strikes the target aircraft and reflects back an echo to the antenna 11 having a frequency $f_1$ which is modified by the doppler effect of the moving aircraft 12. The wave at a frequency $f_1$ is also reflected toward the corner reflector 13 where it is reflected back again towards the target aircraft 12. When the radio energy along the secondary path is reflected from the moving aircraft 12 it is again modified by the doppler effect and the secondary echo signal returning to the antenna 11 has a frequency $f_2$.

The frequencies $f_1$ and $f_2$ are picked up by the receiver 15 and sent to the detector 16 which is a conventional detector circuit well known in the art where a new series of frequencies are produced which are the beat frequencies of $f_0$, $f_1$, $f_2$. These frequencies are: $F_1 = f_0 - f_1$, $F_2 = f_0 - f_2$ and $F_3 = F_2 - f_1$.

Other frequencies representing various combinations of $f_0$, $f_1$, and $f_2$ will also be present in the detector output circuit, but these are of no importance in the operation of the present invention.

The first doppler modified frequency $$f_1 = f_0 + 2V \frac{\cos \alpha}{\lambda_0}$$

where $f_0$ is the frequency of the transmitted signal, V is the aircraft velocity, $\lambda_0$ is the wavelength of the transmitted signal, and $\alpha$ is the angle between the transmitted beam and the horizontal as indicated in FIG. 1. The secondary echo signal modified by the doppler effect of the moving aircraft $$f_2 = f_0 + 2V \frac{\cos \alpha}{\lambda_0} + 2V \frac{\cos \beta}{\lambda_0}$$

where $\beta$ is the angle between the beam of energy from the aircraft to the corner reflector 3 and the horizontal as indicated in FIG. 1.

If antenna 1 is a large distance from the aircraft 2 and the reflector 3, then the angle $\alpha$ is approximately equal to zero and changes very slowly with the movement of the aircraft 12. Then in this case $f_1$ is approximately equal to $$f_0 + \frac{2V}{\lambda_0}$$

a constant frequency. However, angle $\beta$ will change rapidly as the aircraft 12 flies over the reference point at which the corner reflector 3 is located, so $F_2$ will be a changing frequency.

Figure 2:
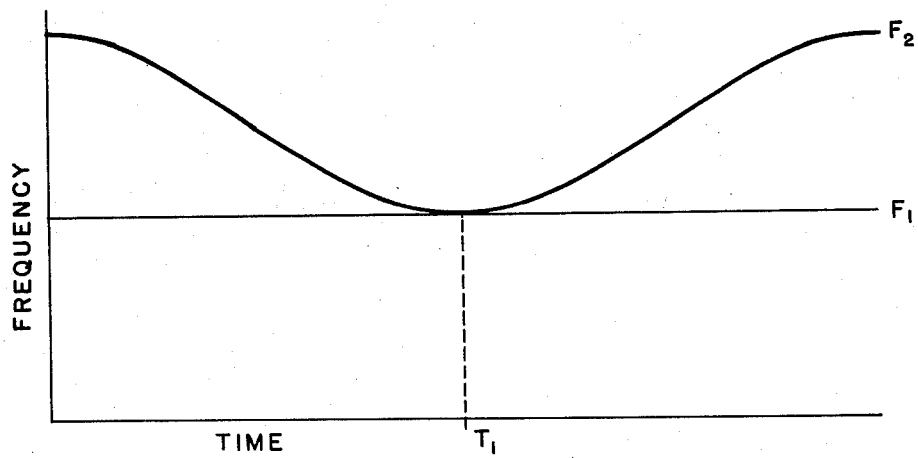
FIG. 2 is a graph representing a variation of two beat frequencies with time in the detector circuit of FIG. 1.

The variation of $F_1$ and $F_2$ with time is illustrated in FIG. 2, as the aircraft flies over the corner reflector 3 located at the reference point. It will be apparent that the frequency $F_2$ will approach zero at a time $t_1$ when the aircraft is directly over the corner reflector 3 and will increase again as the aircraft continues in the opposite direction.

Figure 3:
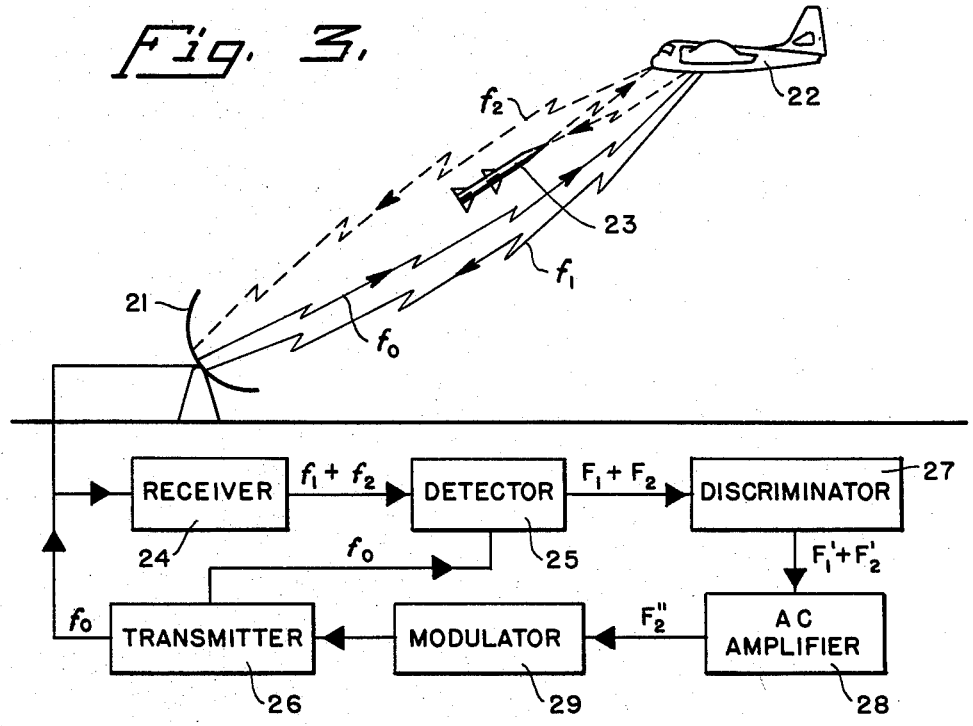
FIG. 3 is a schematic block diagram illustrating another preferred embodiment of the present invention as applied to the fuzing system in a guided missile.

In FIG. 3 an arrangement is illustrated wherein the broad concept of the present invention is applied to provide fuzing action for a guided missile approaching a target aircraft.

In this system the radio frequency energy is transmitted from the antenna 21 at a control station which may be located on the ground or on a control aircraft and the energy at a frequency $f_0$ is sent out towards the approaching aircraft 22 after the missile 23 has been launched. The illuminating radar will control the missile 23 and will illuminate both the aircraft 22 and the missile 23. In one mode of operation as illustrated in FIG. 3, the energy is reflected from the aircraft 22 back to the antenna 21 at a frequency $f_1$ resulting from the doppler effect on the frequency $f_0$ caused by movement of the aircraft 22. Some of the energy reflected from the aircraft 22 will strike the missile 23 and be reflected back to the aircraft at a different frequency due to the doppler effect of the relative velocity between the missile 23 and the aircraft 22 and then reflected again to the antenna 21 at a frequency $f_2$. If desired, a special reflector may be incorporated in the missile to increase the level of energy reflected back to the aircraft and thence to the antenna 21. The receiver 24 at the transmitting station will receive the two frequencies $f_1$ and $f_2$. The frequencies $f_1$ and $f_2$ which are received by the receiver 24 are fed into the detector 25 along with the frequency $f_0$ from the transmitter 26.

The output of the detector 25 consisting of the beat frequencies $F_1$ and $F_2$ are fed into the frequency discriminator 27 which is also a conventional circuit well known in the art and which has a characteristic of producing a voltage proportional to the input frequency. The voltage produced in the discriminator 27 by the action of $F_1$ is $F'_1$ and the voltage produced by $F_2$ is $F'_2$. The voltage $F'_1$ will be a constant or a slowly varying D.C. voltage, while $F'_2$ will change in magnitude when missile 23 passes the target aircraft 22. The voltages $F'_1$ and $F'_2$ are fed into the A.C. amplifier 28 also a conventional circuit well known in the art and having the characteristic of rejecting the D.C. signal voltages and amplifying only voltages which are varying in amplitude. Thus the output of amplifier 28 will consist of a voltage $F''_2$ due to the change in voltage $F'_2$ and there will be no output component due to $F'_1$. The voltage $F''_2$ is fed into the trigger modulator 29 which will respond to a predetermined level of voltage as the voltage $F''_2$ varies in a manner similar to that shown for $F_2$ in FIG. 2, and will interrupt the transmission of the frequency $f_0$ from the transmitter 26 which will then transmit some prearranged code which interruption and code will be detected through its receiving system and interpreted as a command to fire.

An alternative method of operating the system illustrated in FIG. 3 would be to reflect the radio frequency energy at a frequency $f_0$ from the missile toward the target aircraft 22 and receive the doubly reflected signal at a frequency $f_2$ for comparison with the transmitting frequency $f_0$ and the frequency $f_1$ resulting from the doppler effect of the target aircraft alone. The method of comparing and utilizing these frequencies would be the same as in the block diagram of FIG. 3.

Figure 4:
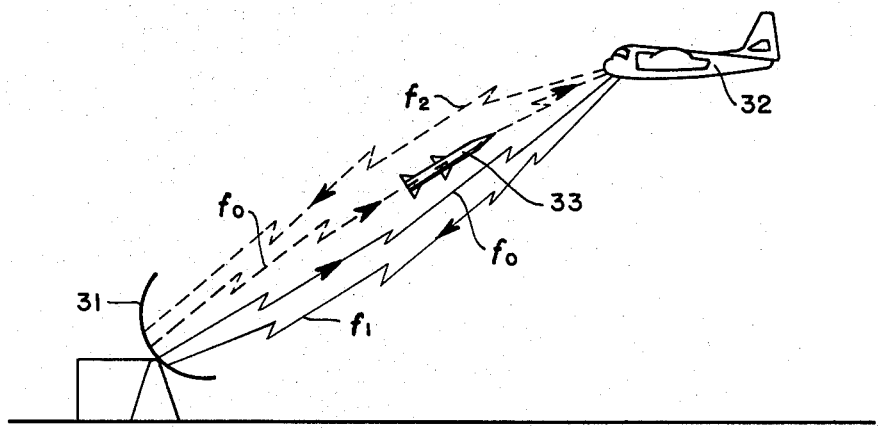
FIG. 4 is a schematic block diagram of a modified form of apparatus similar to that illustrated in FIG. 3.

In the operation of the latter system as illustrated in FIG. 4, it may be desirable to increase the signal strength of the secondary doppler modified frequency by providing a receiver in the tail of the missile 23 and a transmitter in the nose for redirecting the energy toward the target aircraft 22 to provide a secondary reflected echo modified by the doppler effect of the relative speeds between the missile 23 and the aircraft 22 to provide a frequency $f_2$ at the antenna 21.

It will be apparent that the missiles such as those illustrated at 23 and 33 may be guided or in free flight, and it is only necessary that the missile have a receiving system to receive and interpret the firing signal from the antenna 21 or 31.

It will be apparent that the system illustrated in FIGS. 1 and 2 may be provided with conventional electronic circuitry for determining and responding to the minimum value of $F_2$ as desired in a manner analagous to the system illustrated in FIG. 3.

In any of the systems disclosed the zero or lowest value of $F_2$ or $F''_2$ may be utilized for an indication or controlling some subsequent action, or if desired, some other predetermined level may be utilized. As an example in FIG. 3 the modulator 29 might be set to interrupt the transmitter 26 when the voltage output $F''_2$ from the amplifier 28 drops to a value of 0.2 volt.

Obviously many modifications and variations of the present invention are possible in the light of the above teachings. It is therefore to be understood that within the scope of the appended claims the invention may be practiced otherwise than as specifically described.

What is claimed is:

1. A system for detecting the closest approach between a moving object and another object comprising a radar transmitter adapted to transmit radio frequency energy at a certain frequency whereby said energy is reflected from said moving object at a frequency which is modified by the doppler effect, said other object being adapted to direct said energy toward the moving object for reflection therefrom at a second frequency modified by the doppler effect of the relative velocity between said moving object and said other object, and means adapted to receive said energy and responsive to said secondary doppler frequency to indicate the variation of said frequency.

2. A system for detecting the closest approach between a moving object and another object comprising a radar transmitter adapted to transmit radio frequency energy at a certain frequency whereby energy is reflected from said moving object at a frequency which is modified by the doppler effect, another object adapted to reflect said reflected energy back toward the moving object for reflection therefrom at a second frequency modified by the doppler effect of the relative velocity between said moving object and said other object, and means responsive to said secondary doppler frequency to indicate the variation of said frequency.

3. A system for detecting the closest approach between a moving object and another object comprising a radar transmitter adapted to transmit radio frequency energy at a certain frequency whereby energy is reflected from said moving object at a frequency which is modified by the doppler effect, another objected adapted to reflect said reflected energy back toward the moving object for reflection therefrom at a second frequency modified by the doppler effect of the relative velocity between said moving object and said other object, and means responsive to said primary and secondary doppler frequencies to indicate the variation of one of said frequencies.

4. A system for detecting the closest approach between a moving object and another object comprising a radar transmitter adapted to transmits radio frequency energy at a certain frequency whereby energy is reflected from said moving object at a frequency which is modified by the doppler effect, another object adapted to reflect said reflected energy back toward the moving object for reflection therefrom at a second frequency modified by the doppler effect of the relative velocity between said moving object and said other object, and means for generating a voltage proportional to the difference between said certain frequency and said secondary doppler frequency to indicate the spatial relation when said frequency approaches a minimum.

5. A fuzing system comprising a radar transmitter and receiver for guiding and controlling a guided missile having a fuzing circuit, said transmitter being adapted to transmit an illuminating radio frequency signal at a certain frequency, the echo signal from the target aircraft being reflected along a primary path at a frequency modified by the doppler effect of the movement of the aircraft, another echo signal being directed along a secondary path from the missile toward the aircraft and reflected at a second frequency modified by the doppler effect of the relative speed between the missile and aircraft, means for receiving said doppler modified frequencies and mixing said frequencies to provide beat frequency outputs, means for providing a voltage output related to the sum of the beat frequencies, and means responsive to a predetermined signal level of said voltage output for transmitting a signal to said missile for actuating the fuzing circuit thereof.

6. A fuzing system comprising a radar transmitter and receiver for guiding and controlling a guided missile having a fuzing circuit, said transmitter being adapted to transmit an illuminating radio frequency signal at a certain frequency, the echo signal from the target aircraft being reflected along a primary path at a frequency modified by the doppler effect of the movement of the aircraft, another echo signal being directed along a secondary path from the missile toward the aircraft and reflected at a secondary frequency modified by the doppler effect of the relative speed between the missile and aircraft, means for receiving said doppler modified frequencies and mixing said frequencies with said transmitted frequency to provide beat frequency outputs, means for providing a voltage proportional to the sum of the beat frequencies, and means for amplifying the variation in amplitude of said voltage, and means responsive to a predetermined signal level of said voltage output for transmitting a code signal to said missile for actuating the fuzing circuit thereof.

7. A fuzing system comprising a radar transmitter and receiver for guiding and controlling a guided missile having a fuzing circuit, said transmitter being adapted to transmit an illuminating radio frequency signal at a certain frequency, the echo signal from the target aircraft being reflected along a primary path at a frequency modified by the doppler effect of the movement of the aircraft, a reflector mounted on said missile whereby another signal is reflected from the missile toward the aircraft and reflected at a second frequency modified by the doppler effect of the relative speeds between the missile and aircraft, means for receiving said doppler modified frequencies and mixing said frequencies with the transmitted frequency to provide beat frequency outputs, means for providing a voltage proportional to the sum of the beat frequencies, and means for amplifying the variation in amplitude of said voltage, and means responsive to a predetermined signal level of said voltage output for transmitting a code signal to said missile for actuating the fuzing circuit thereof.

8. A fuzing system comprising a radar transmitter and receiver for guiding and controlling a guided missile having a fuzing circuit, said transmitter being adapted to transmit an illuminating radio frequency signal at a certain frequency, the echo signal from the target aircraft being reflected along a primary path at a modified frequency modified by the doppler effect of the movement of the aircraft, means on said missile for receiving said transmitted signal and retransmitting another signal from the missile toward the aircraft which is reflected at a second frequency modified by the doppler effect of the relative speeds between the missile and the aircraft, means for receiving said doppler modified frequencies and mixing said frequencies with the transmitted frequency to provide beat frequency outputs, means for providing a voltage proportional to the sum of the beat frequencies, and means for amplifying the variation in amplitude of said voltage, and means responsive to a predetermined signal level of said voltage output for transmitting a code signal to said missile for actuating the fuzing circuit thereof.

9. A system for detecting the closest approach of a moving object relative to a remote station comprising a radar transmitter at a control station adapted to transmit a certain frequency, and a reflector positioned at said remote station to reflect energy reflected from said aircraft back toward the aircraft, a receiver at the control station adapted to receive a frequency along a primary path modified by the doppler effect of the movement of the aircraft toward the control station and a second frequency along a secondary path also modified by the doppler effect of the movement of the aircraft with respect to the reflector at said remote station.

10. A system for detecting the closest approach of a moving object relative to a remote station comprising a radar transmitter at a control station adapted to transmit a certain frequency, a reflector positioned at said remote station to reflect energy reflected from said aircraft back toward the aircraft, a receiver at the control station adapted to receive a frequency along a primary path modified by the doppler effect of the movement of the aircraft toward the control station and a second frequency along a secondary path also modified by the doppler effect of the movement of the aircraft with respect to the reflector at said remote station, and means for indicating variations of the beat frequency between said transmitted frequency and one of said doppler modified frequencies.

11. A system for detecting the closest approach of a moving object relative to a remote station comprising a radar transmitter at a control station adapted to transmit a certain frequency, a reflector positioned at said remote station to reflect energy reflected from said aircraft back toward the aircraft, a receiver at the control station adapted to receive a frequency along a primary path modified by the doppler effect of the movement of the aircraft toward the control station and a second frequency along a secondary path modified by the doppler effect of the movement of the aircraft with respect to the reflector at said remote station, and means for generating a voltage proportional to the beat frequency between said transmitted frequency and one of said doppler modified frequencies.

12. A system for detecting the closest approach of a moving object relative to a remote station comprising a radar transmitter at a control station adapted to transmit a certain frequency, a reflector positioned at said remote station to reflect energy reflected from said aircraft back toward the aircraft, a receiver at the control station adapted to receive a frequency along a primary path modified by the doppler effect of the movement of the aircraft toward the control station and a second frequency along a secondary path also modified by the doppler effect of the movement of the aircraft with respect to the reflector at said remote station, and means for generating a voltage proportional to the beat frequency between said transmitted frequency and said secondary doppler modified frequency.

References Cited in the file of this patent
UNITED STATES PATENTS
2,491,542    Woodyard et al. _____ Dec. 20, 1949